(12) United States Patent
Hemme et al.

(10) Patent No.: US 6,992,042 B2
(45) Date of Patent: Jan. 31, 2006

(54) DOPED TITANIUM OXIDES

(75) Inventors: Ina Hemme, Hanau (DE); Helmut Mangold, Rodenbach (DE); Sven-Uwe Geissen, Clausthal-Zellerfeld (DE); Anna Moiseev, Clausthal-Zellerfeld (DE)

(73) Assignee: Degussa AG, Düsseldorf (DE)

( * ) Notice: Subject to any disclaimer, the term of this patent is extended or adjusted under 35 U.S.C. 154(b) by 109 days.

(21) Appl. No.: 10/435,038

(22) Filed: May 12, 2003

(65) Prior Publication Data

US 2004/0009119 A1 Jan. 15, 2004

Related U.S. Application Data

(62) Division of application No. 09/817,789, filed on Mar. 27, 2001, now Pat. No. 6,627,173.

(30) Foreign Application Priority Data

| Mar. 28, 2000 | (EP) | ................................. 00106612 |
| Mar. 29, 2000 | (EP) | ................................. 00106687 |

(51) Int. Cl.
  *B01J 21/06* (2006.01)
  *B01J 35/00* (2006.01)
  *B01D 53/86* (2006.01)
  *C02F 1/32* (2006.01)
  *C09D 5/00* (2006.01)

(52) U.S. Cl. ................. 502/350; 106/287.19; 210/763; 210/748; 423/210; 501/351

(58) Field of Classification Search ................ 423/593, 423/596, 598, 600, 610–613, 622, 593.1, 423/210; 502/350, 351; 210/748, 763; 106/287.19
See application file for complete search history.

(56) References Cited

U.S. PATENT DOCUMENTS

| 4,048,290 | A |   | 9/1977  | Lee |
| 4,863,608 | A | * | 9/1989  | Kawai et al. ................ 210/638 |
| 4,937,062 | A | * | 6/1990  | Jordan et al. ............. 423/592.1 |
| 5,242,557 | A |   | 9/1993  | Jones et al. |
| 5,451,390 | A | * | 9/1995  | Hartmann et al. .......... 423/610 |
| 5,672,330 | A | * | 9/1997  | Hartmann et al. .......... 423/610 |
| 5,698,177 | A |   | 12/1997 | Pratsinis et al. |
| 5,762,914 | A | * | 6/1998  | Hartmann et al. ............. 424/59 |
| 6,328,944 | B1 |   | 12/2001 | Mangold et al. |
| 6,613,300 | B2 | * | 9/2003  | Mangold et al. ............. 423/278 |
| 6,695,907 | B2 | * | 2/2004  | Mangold et al. ............. 106/482 |
| 6,773,682 | B1 | * | 8/2004  | Benda ..................... 422/186.3 |

FOREIGN PATENT DOCUMENTS

| EP | 0 595 078 | 10/1993 |
| EP | 0 850 876 | 11/1997 |

OTHER PUBLICATIONS

EPO Search Report for application 00 10 6687, with mailing date Aug. 21, 2000.*
Matthews, R.W., and McEvoy, S.R., J. Photochem. Photobiol. A: Chem. 64, 231-246 (1992).
Bickley, R., et al., J. Solid State Chem. 92, 178-190 (1991).
Franke, R., and Franke C., Chemosphere 39(15), 2651-2659 (1999).
Zen, H., Jeti 46 (10), 66-67 (1998).
Loddo, V., et al., Applied Catalysis B: Environmental 20, 29-45 (1999).
Formenti et al., Preparation in a Hydrogen-Oxygen Flame of Ultrafine Metal Oxide Particles Journal of Colloid and Interface science, vol. 30, No. 1 p. 79-89, Apr. 1972.
Bickley et al. Characterisation of Iron/Titanium Oxide Photocatalysts, J. Chem. Soc. and Faraday Trans., Aug. 1994, 90(15).
English language abstract of EP 0850876A1, Derwent accession no. 1998-323503/199829.
English language abstract of EP 0595078A2, Derwent accession No. 1994-145298/199418.

\* cited by examiner

*Primary Examiner*—Stanley S. Silverman
*Assistant Examiner*—Ardith E Hertzog
(74) *Attorney, Agent, or Firm*—Smith, Gambrell & Russell, LLP

(57) ABSTRACT

Pyrogenically prepared titanium dioxide doped by means of an aerosol contains an oxide from the group zinc oxide, platinum oxide, magnesium oxide and/or aluminium oxide as the doping component. It is prepared as follows: in the pyrogenic preparation of titanium dioxide, a metal salt solution is atomised to form an aerosol and injected into the production stream. The titanium dioxide may be used as a photocatalyst or as a UV adsorber or in processes for purification of waste water or waste air/gases.

6 Claims, 1 Drawing Sheet

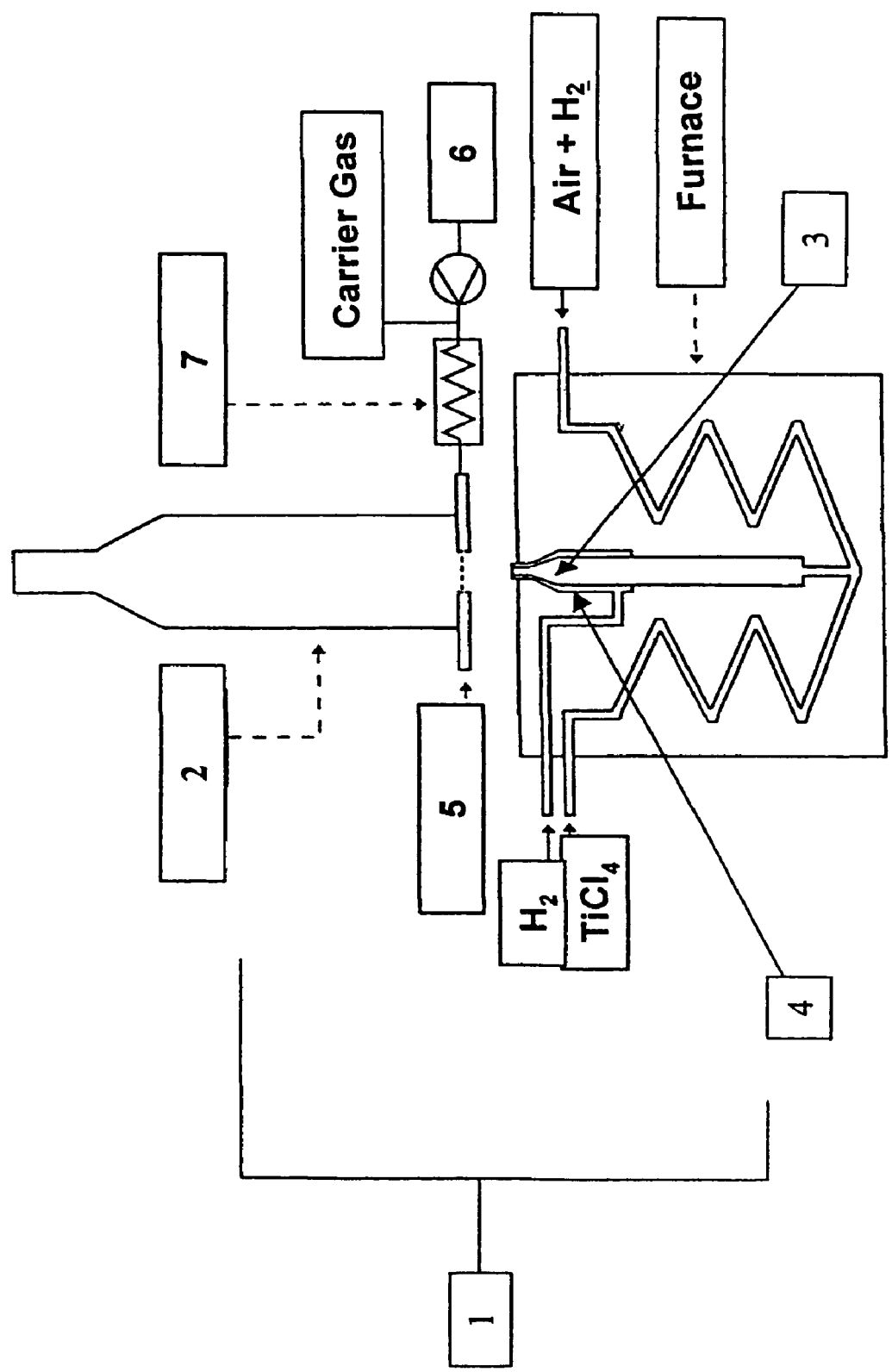

DOPED TITANIUM OXIDES

CROSS-REFERENCE TO RELATED APPLICATIONS

This application is a divisional of U.S. patent application Ser. No. 09/817,789, filed Mar. 27, 2001 now U.S. Pat. No. 6,627,173, which in turn claims priority to European Application No. 00 106 612.5, filed on Mar. 28, 2000, and European Application No. 00 106 687.7, filed on Mar. 29, 2000. The subject matter of all applications are incorporated herein in their entirety by reference.

BACKGROUND OF THE INVENTION

1. Field of the Invention

The invention relates to doped titanium dioxide, to a process for its preparation and to its use.

2. Background Information

Pyrogenic titanium dioxide (obtainable commercially as Degussa $TiO_2$ P 25) is distinguished by the variety of its possible uses in the field of photocatalysis. (R. W. Matthews, S. R. McEvoy, *J. Photochem. Photobiol. A: Chem.* 64, 231–246, 1992; R. I. Bickley et al., *Journal of Solid State Chemistry* 92, 178–190, 1991; R. Franke and C. Franke, *Chemosphere* 39(15), 2651–2659, 1999; H. Zen, *JETI* 46(10), 66–67, 1998). It is used as a reference material having a high degree of photocatalytic activity (V. Loddo et al., *Applied Catalysis B: Environmental* 20, 29–45, 1999).

SUMMARY OF THE INVENTION

The invention provides a titanium dioxide doped by means of an aerosol and containing an oxide from the group zinc oxide, platinum oxide, magnesium oxide and/or aluminium oxide as the doping component.

The invention also provides a process for the preparation of the titanium dioxide doped by means of an aerosol, which process is characterised in that an aerosol is fed into a flame such as is used for the preparation of pyrogenic titanium dioxide by means of flame hydrolysis, that aerosol is mixed homogeneously before or during the reaction with the gas mixture of the flame oxidation or flame hydrolysis, the aerosol/gas mixture is allowed to react in a flame, and the resulting doped, pyrogenically prepared oxide is separated from the gas stream in a known manner, there being used as the starting material for the aerosol a salt solution or suspension containing the component of the substance to be doped, which may be a metal salt or metalloid salt or mixtures of the two or a suspension of an insoluble metal or metalloid compound or a mixture of the two, the aerosol being produced by atomisation by means of a two-component nozzle or by an aerosol generator, preferably by ultrasonic atomisation.

There may be used as the substance to be doped salts of zinc, magnesium, aluminium and/or noble metals such as platinum, palladium, silver, gold. There may preferably be used aqueous solutions of those salts, which may optionally be acidified. There may preferably be used as salts zinc chloride, hexachloroplatinic acid, magnesium chloride, aluminium chloride.

The process for doping by means of an aerosol may be carried out substantially as described in the document EP 0 850 876 A1.

The process of flame hydrolysis to prepare pyrogenic titanium dioxide is known from Ullmann's Enzyklopadie der technischen Chemie, 4th Edition, Volume 21, page 464.

The titanium dioxides doped by means of an aerosol according to the invention may exhibit concentrations of the doping substances in a range of from 0.00001 wt. % to 20 wt. %, preferably from 0.1 ppm to 10,000 ppm. The BET surface areas may be from 5 $m^2/g$ to 150 $m^2/g$, preferably from 35 $m^2/g$ to 110 $m^2/g$.

In order to produce a high level of photocatalytic activity, the BET surface area may be from 65 $m^2/g$ to 80 $m^2/g$. In that case, the amount of doping component may be from 40 ppm to 800 ppm.

In order to produce low photocatalytic activity, the BET surface area may be from 35 $m^2/g$ to 60 $m^2/g$. In that case, the amount of doping component may be greater than 1000 ppm.

When the titanium dioxides doped by means of an aerosol according to the invention have a high level of photocatalytic activity, they may be used for the purification of waste air and/or waste gases.

They may be fixed to a support.

When the titanium dioxides according to the invention have a high level of photocatalytic activity, they may be used for the degradation of impurities in waste water and/or waste air and/or waste gases. In that case, the titanium dioxides may be used both suspended in the waste water and/or waste air and fixed to a support.

When the titanium dioxides according to the invention have low photocatalytic activity, they may be used as an adsorbent for UV radiation. They may be used in the coating of glasses or in plastics.

The titanium dioxides according to the invention may also be used for application to glasses, to plastics, for the removal of impurities from air, gases, water, etc. when they have a high level of photocatalytic activity.

The titanium dioxides according to the invention having a high level of photocatalytic activity may also be used for the sterilisation of water with UV irradiation.

The photocatalytic activity of the titanium dioxides doped by means of an aerosol according to the invention is tested in the photocatalytic degradation of chlorinated hydrocarbons with UV irradiation in optionally acidified, aqueous suspension.

In those tests, it is found that the photocatalytic activity of the titanium dioxides according to the invention in optionally acidified aqueous suspension can be increased or reduced by doping with oxides of metals/noble metals or metalloids.

Surprisingly, the photocatalytic activity in the degradation of chlorinated hydrocarbons in aqueous suspension is increased even though homogeneous intermixing of the doping component and the titanium dioxide has taken place. The doping component in that case is therefore not exclusively on the titanium dioxide, but also in the titanium dioxide.

A higher degree of doping contributes towards lowering the photocatalytic activity. In order to determine the photocatalytic activity, the degradation of chlorinated hydrocarbons (4-chlorophenol (4-CP) and dichloroacetic acid (DCA)) with UV irradiation in a stirred reactor is tested.

In order to increase the rate of photocatalytic degradation of chlorinated hydrocarbons in optionally acidic aqueous suspension by the doped pyrogenically prepared titanium dioxides, the BET surface area is preferably in the range of from 70 $m^2/g$ to 85 $m^2/g$.

In order to lower the photocatalytic activity, which is likewise tested by the degradation of 4-chlorophenol and dichloroacetic acid with UV irradiation in purely aqueous or acidified aqueous suspension, the BET surface area is preferably in the range of from 50 $m^2/g$ to 60 $m^2/g$.

Moreover, a change in the amount of doping component leads to a change in the rate of photocatalytic degradation of the chlorinated hydrocarbons with UV irradiation.

BRIEF DESCRIPTION OF THE FIGURES

FIG. 1 diagrammatically shows the burner arrangement used in Examples 1 to 6.

DETAILED DESCRIPTION OF THE INVENTION

EXAMPLES

The initial reaction rates (after the first 30 minutes) of selected doped titanium dioxide catalysts [mg TOC*$1^{-1}$ $min^{-1}$ (TOC=total organic carbon=organically bonded carbon)] of DCA (dichloroacetic acid) and 4-CP (4-chlorophenol) in an optionally acidified aqueous suspension with UV irradiation are measured.

The photocatalytic rate of degradation of chlorinated hydrocarbons with UV irradiation in optionally acidified aqueous suspension with the use of pure titanium dioxide Degussa P 25 as photocatalyst is used as the reference value (zero value). The duration of the tests with Degussa P 25 is not more than 360 minutes. The initial reaction rate of the photocatalytic degradation of chlorinated hydrocarbons in optionally acidified aqueous suspension is determined.

The photocatalytic degradation of chlorinated hydrocarbons with UV irradiation in purely aqueous or acidified aqueous suspension, that is to say without the addition of titanium dioxide, over several hours (max. 360 minutes=min.) is likewise monitored.

The results of the initial reaction rate and the results in respect of the photocatalytic degradation of chlorinated hydrocarbons in purely aqueous or acidified suspension are given in Table 3, Table 4 and Table 5.

Doping with $Al_2O_3$, $PtO_2$ or MgO gives an especially high initial reaction rate of the degradation of dichloroacetic acid and 4-chlorophenol (initial concentration of both chlorinated hydrocarbons: c=120 mg/l) in purely aqueous or acidified aqueous suspension with UV irradiation, in comparison with Degussa P 25 (see Table 5).

If ZnO is used as the doping substance, different effects are achieved according to the BET surface area and the doping amount.

With a BET surface area of 78 $m^2/g$ and a ZnO doping amount of 430±20 ppm, the initial reaction rate of the degradation of dichloroacetic acid and 4-chlorophenol in purely aqueous or acidified aqueous suspension with UV irradiation is greatly increased in comparison with Degussa P 25.

With a BET surface area of 56 $m^2/g$ and a ZnO doping amount of 0.13 (±0.02) %, the initial reaction rate in the degradation of dichloroacetic acid in purely aqueous or acidified aqueous suspension with UV irradiation is increased by only 29% as compared with Degussa P 25.

In the degradation of 4-chlorophenol, the initial reaction rate in purely aqueous or acidified aqueous suspension with UV irradiation is reduced by 31% in comparison with Degussa P 25 (see Table 5).

In addition, pure $TiO_2$ having a BET surface area of 82 $m^2/g$ is also tested as a photocatalyst, in order to rule out the possibility that the increase in the initial reaction rate of the photocatalytic degradation of 4-chlorophenol and dichloroacetic acid in purely aqueous or acidified aqueous suspension with UV irradiation, in comparison with Degussa titanium dioxide P 25, is based solely on the increase in surface area.

Although the increase in surface area does bring about increased photocatalytic degradation of 4-chlorophenol and dichloroacetic acid, the increase is not as great as that brought about by doping (see Table 5).

Preparation of the Doped Titanium Dioxides

According to FIG. 1, the core element of the apparatus is the open burner 1 of known type, as is customarily used for the preparation of pyrogenic oxides. The burner 1 consists of an inner nozzle 3, from which the main gas stream flows into the flame tube 2 and burns. The inner nozzle 3 is surrounded by a further nozzle 4 (jacket nozzle), from which ring or secondary hydrogen flows in order to avoid caking. Between the nozzle outlet and the flame tube there is arranged a diaphragm 5 through which the aerosol is fed in, the aerosol gas stream from the diaphragm being mixed homogeneously with the gas stream of the inner nozzle and the jacket nozzle. The aerosol is produced in an aerosol generator 6 (ultrasonic atomiser). The starting material used for the aerosol is an aqueous salt solution containing the metal/noble metal or metalloid to be doped as a salt or chloro acid in dissolved or dispersed/suspended form.

The aerosol produced by the aerosol generator 6 is guided by means of a carrier gas stream through the heating zone 7, in which the water evaporates and there remain behind in the gas phase small salt crystallites in finely divided form.

The individual conditions for the preparation of the oxides are given in Table 1.

Example 1

Doping with $Al_2O_3$ 0.66 kg/h of $TiCl_4$ is vaporised at 280° C. and introduced into the central pipe of the burner. 0.54 $Nm^3/h$ of hydrogen and 3.41 $Nm^3/h$ of air are additionally fed into the central pipe. The gas mixture flows from the inner nozzle of the burner and burns, since it is an open burner, into the flame tube. 0.23 $Nm^3/h$ of jacket or secondary hydrogen is fed into the jacket nozzle, which surrounds the central nozzle, in order to prevent caking at the nozzles.

The aerosol is applied from the diaphragm (diameter: 35 mm; slot width: 0.4 mm), which is located in a horizontal position between the outlet from the burner head and the flame tube. The aerosol is an aluminium chloride salt aerosol, which is produced by ultrasonic atomisation of a 1% aqueous $AlCl_3 \cdot 6H_2O$ solution in the aerosol generator in an amount of 126 g/h. The aluminium salt aerosol is guided with the aid of the carrier gas, which is 0.04 $Nm^3/h$ of nitrogen, through a heated pipe, the aerosol changing at temperatures of about 215° C. into a gas and a salt crystal aerosol.

The reaction gases, additional air from the surroundings drawn in through the open burner and the $Al_2O_3$-doped, pyrogenically prepared titanium dioxide that has formed, are drawn through the cooling system by means of low pressure and thereby cooled to 100° C.–160° C. The solid is separated from the gas stream by means of a filter or cyclone. The resulting $Al_2O_3$-doped, pyrogenically prepared titanium dioxide is a finely divided white powder.

In a subsequent step, the hydrochloric acid residues adhering to the titanium dioxide are removed at elevated temperature by treatment with air containing water vapour. The BET surface area of the doped, pyrogenically prepared titanium dioxide is 75 $m^2/g$. Further analytical data are given in Table 2.

Example 2

Doping with $PtO_2$ 0.65 kg/h of $TiCl_4$ is vaporised at 280° C. and introduced into the central pipe of the burner. 0.54 $Nm^3/h$ of hydrogen and 3.41 $Nm^3/h$ of air are additionally fed into the central pipe. The gas mixture flows from the inner nozzle of the burner and bums, since it is an open burner, into the flame tube. 0.23 $Nm^3/h$ of jacket or secondary hydrogen is fed into the jacket nozzle, which surrounds the central nozzle, in order to prevent caking at the nozzles.

The aerosol is applied from the diaphragm (diameter: 35 mm; slot width: 0.4 mm), which is located in a horizontal position between the outlet from the burner head and the flame tube. The aerosol is a hexachloroplatinic acid aerosol, which is produced by ultrasonic atomisation of a 0.5% aqueous $H_2PtCl_6$ solution in the aerosol generator in an amount of 27.0 g/h. The hexachloroplatinic acid aerosol is guided with the aid of the carrier gas, which is 0.04 $Nm^3/h$ of nitrogen, through a heated pipe, the aerosol changing at temperatures of about 344° C. into a gas and a salt crystal aerosol.

The reaction gases, additional air from the surroundings drawn in through the open burner and the $PtO_2$-doped, pyrogenically prepared titanium dioxide that has formed, are drawn through a cooling system by means of low pressure and thereby cooled to 100° C.–160° C. The solid is separated from the gas stream by means of a filter or cyclone. The resulting $PtO_2$-doped, pyrogenically prepared titanium dioxide is a finely divided white powder.

In a subsequent step, the hydrochloric acid residues adhering to the titanium dioxide are removed at elevated temperature by treatment with air containing water vapour. The BET surface area of the $PtO_2$-doped, pyrogenically prepared titanium dioxide is 73 $m^2/g$. Further analytical data are summarised in Table 2.

Example 3

Doping with MgO 0.66 kg/h of $TiCl_4$ is vaporised at 280° C. and introduced into the central pipe of the burner. 0.54 $Nm^3/h$ of hydrogen and 3.41 $Nm^3/h$ of air are additionally fed into the central pipe. The gas mixture flows from the inner nozzle of the burner and bums, since it is an open burner, into the flame tube. 0.23 $Nm^3/h$ of jacket or secondary hydrogen is fed into the jacket nozzle, which surrounds the central nozzle, in order to prevent caking at the nozzles.

The aerosol is applied from the diaphragm (diameter: 35 mm; slot width: 0.4 mm), which is located in a horizontal position between the outlet from the burner head and the flame tube. The aerosol is a magnesium chloride salt aerosol, which is produced by ultrasonic atomisation of a 0.5% aqueous $MgCl_2 \cdot 6H_2O$ solution in the aerosol generator in an amount of 21.4 g/h. The magnesium salt aerosol is guided with the aid of the carrier gas, which is 0.04 $Nm^3/h$ of nitrogen, through a heated pipe, the aerosol changing at temperatures of about 331° C. into a gas and a salt crystal aerosol.

The reaction gases, additional air from the surroundings drawn in through the open burner and the MgO-doped, pyrogenically prepared titanium dioxide that has formed, are drawn through a cooling system by means of low pressure and thereby cooled to 100° C.–160° C. The solid is separated from the gas stream by means of a filter or cyclone. The MgO-doped, pyrogenically prepared titanium dioxide is a finely divided white powder.

In a subsequent step, the hydrochloric acid residues adhering to the titanium dioxide are removed at elevated temperature by treatment with air containing water vapour. The BET surface area of the MgO-doped, pyrogenically prepared titanium dioxide is 77 $m^2/g$. Further analytical data are summarised in Table 2.

Example 4

Doping with ZnO 0.65 kg/h of $TiCl_4$ is vaporised at 280° C. and introduced into the central pipe of the burner. 0.54 $Nm^3/h$ of hydrogen and 3.41 $Nm^3/h$ of air are additionally fed into the central pipe. The gas mixture flows from the inner nozzle of the burner and burns, since it is an open burner, into the flame tube. 0.23 $Nm^3/h$ of jacket or secondary hydrogen is fed into the jacket nozzle, which surrounds the central nozzle, in order to prevent caking at the nozzles.

The aerosol is applied from the diaphragm (diameter: 35 mm; slot width: 0.4 mm), which is located in a horizontal position between the outlet from the burner head and the flame tube. The aerosol is a zinc chloride salt aerosol, which is produced by ultrasonic atomisation of a 3% aqueous $ZnCl_2$ solution in the aerosol generator in an amount of 31.7 g/h. The zinc salt aerosol is guided with the aid of the carrier gas, which is 0.04 $Nm^3/h$ of nitrogen, through a heated pipe, the aerosol changing at temperatures of about 303° C. into a gas and a salt crystal aerosol.

The reaction gases, additional air from the surroundings drawn in through the open burner and the ZnO-doped, pyrogenically prepared titanium dioxide that has formed, are drawn through a cooling system by means of low pressure and thereby cooled to 100° C.–160° C. The solid is separated from the gas stream by means of a filter or cyclone. The resulting ZnO-doped, pyrogenically prepared titanium dioxide is a finely divided white powder.

In a subsequent step, the hydrochloric acid residues adhering to the titanium dioxide are removed at elevated temperature by treatment with air containing water vapour. The BET surface area of the ZnO-doped, pyrogenically prepared titanium dioxide is 78 m$^2$/g. Further analytical data are summarised in Table 2.

Example 5

Doping with ZnO 1.32 kg/h of TiCl$_4$ are vaporised at 280° C. and introduced into the central pipe of the burner. 0.33 Nm$^3$/h of hydrogen and 2.68 Nm$^3$/h of air are additionally fed into the central pipe. The gas mixture flows from the inner nozzle of the burner and burns, since it is an open burner, into the flame tube. 0.1 Nm$^3$/h of jacket or secondary hydrogen is fed into the jacket nozzle, which surrounds the central nozzle, in order to prevent caking at the nozzles.

The aerosol is applied from the diaphragm (diameter: 35 mm; slot width: 0.4 mm), which is located in a horizontal position between the outlet from the burner head and the flame tube. The aerosol is a zinc chloride salt aerosol, which is produced by ultrasonic atomisation of a 2% aqueous ZnCl$_2$ solution in the aerosol generator in an amount of 112.6 g/h. The zinc salt aerosol is guided with the aid of the carrier gas, which is 0.04 Nm$^3$/h of nitrogen, through a heated pipe, the aerosol changing at temperatures of about 215° C. into a gas and a salt crystal aerosol.

The reaction gases, additional air from the surroundings drawn in through the open burner and the ZnO-doped, pyrogenically prepared titanium dioxide that has formed, are drawn through the cooling system by means of low pressure and thereby cooled to 100° C.–160° C. The solid is separated from the gas stream by means of a filter or cyclone. The ZnO-doped, pyrogenically prepared titanium dioxide is a finely divided white powder.

In a subsequent step, the hydrochloric acid residues adhering to the titanium dioxide are removed at elevated temperature by treatment with air containing water vapour. The BET surface area of the ZnO-doped, pyrogenically prepared titanium dioxide is 56 m$^2$/g. Further analytical data are summarised in Table 2.

Example 6

Preparation of TiO$_2$ 0.42 kg/h of TiCl$_4$ is vaporised at 280° C. and introduced into the central pipe of the burner. 0.21 Nm$^3$/h of hydrogen, 3.78 Nm$^3$/h of air and 0.04 Nm$^3$/h of nitrogen are additionally fed into the central pipe. The gas mixture flows from the inner nozzle of the burner and burns, since it is an open burner, into the flame tube. 0.23 Nm$^3$/h of jacket or secondary hydrogen is fed into the jacket nozzle, which surrounds the central nozzle, in order to prevent caking at the nozzles.

The reaction gases, additional air from the surroundings drawn in through the open burner and the pyrogenically prepared titanium dioxide that has formed, are drawn through a cooling system by means of low pressure and thereby cooled to 100° C.–160° C. The solid is separated from the gas stream by means of a filter or cyclone. The pyrogenically prepared titanium dioxide having a large surface area is a finely divided white powder.

In a subsequent step, the hydrochloric acid residues adhering to the titanium dioxide are removed at elevated temperature by treatment with air containing water vapour. The BET surface area of the pyrogenically prepared titanium dioxide is 82 m$^2$/g. Further analytical data are summarised in Table 2.

Experimental Procedure for Determining the Rate of Photocatalytic Degradation of Chlorinated Hydrocarbons in Suspension.

The total running time of the tests to investigate the rate of photocatalytic degradation of chlorinated hydrocarbons such as 4-chlorophenol (4-CP) and dichloroacetic acid (DCA) with UV irradiation in purely aqueous or acidified aqueous suspension is not more than 360 minutes.

The degradation reaction is carried out in a stirred reactor. In addition, the suspension to be studied is pumped from the storage container to the stirred reactor and back, so that uniform UV irradiation is ensured. The pH value of the suspension is in the range of from 4 to 7, preferably at pH=5. The temperature in the stirred reactor is in the range of from 25° C. to 40° C., preferably from 30° C. to 35° C. The concentration of the particular photocatalytically active or less active titanium dioxide, that is to say pure titanium dioxide P 25 or according to Example 6, Tables 3 and 4 or doped titanium dioxide as described in Tables 3–4, is 1 g/l. The temperature is kept constant within the mentioned range by means of continuous pumping from the storage vessel to the UV irradiation unit and back, as well as by cooling of the UV lamp system by means of cooling water. The progress of the degradation of the chlorinated hydrocarbons with UV irradiation is monitored continuously throughout the degradation reaction.

From this determination of the TOC value (TOC=total organic carbon=organically bonded carbon) which takes place at regular intervals, it is possible to determine the factor TOC/TOC$_0$ (TOC$_0$=initial concentration of organically bonded carbon in suspension). TOC/TOC$_0$ indicates the percentage TOC content at a particular withdrawal time.

The progress of the degradation of chlorinated hydrocarbons is plotted in a TOC/TOC$_0$-time curve. The rate of degradation of Degussa P 25 is tested as the standard, likewise under the same conditions.

The entire course of the curve is recorded.

Blind tests of the degradation of 4-chlorophenol and dichloroacetic acid with UV irradiation but without the addition of titanium dioxides are also carried out.

If titanium dioxide is not used, the TOC/TOC$_0$ values still present are greater than 89%, so that virtually no degradation takes place in that case.

Test results of the photocatalytic degradation of 4-chlorophenol.

Example 7

Blind Test

Only 4-chlorophenol in acidified aqueous solution is introduced into the storage vessel and the stirred reactor and treated. No $TiO_2$ is added. A $TOC/TOC_0$-time curve is recorded. After 300 minutes, 89.82% of the initial TOC content is still present. An initial reaction rate is not determined.

Example 8

P 25

4-Chlorophenol and 1 g/l of titanium dioxide P 25 in acidified aqueous suspension are introduced into the storage vessel and the stirred reactor and treated as indicated above. A $TOC/TOC_0$-time curve is recorded. After 300 minutes, only 20.91% of the initial TOC content is still present. The initial reaction rate is used as the standard and taken as zero. All values obtained with the titanium dioxides according to Examples 9 to 14 are based on this P 25 value.

Example 9

Doping with $Al_2O_3$

4-Chlorophenol and 1 g/l of catalyst according to Example 1 in acidified aqueous suspension are introduced into the storage vessel and the stirred reactor and treated as indicated above. A $TOC/TOC_0$-time curve is recorded. After 300 minutes, only 8.36% of the initial TOC content of the 4-chlorophenol is still present. The initial reaction rate is increased by 51% in comparison with P 25 (Example 8).

Example 10

Doping with $PtO_2$

4-Chlorophenol and 1 g/l of catalyst according to Example 2 in acidified aqueous suspension are introduced into the storage vessel and the stirred reactor and treated as indicated above. A $TOC/TOC_0$-time curve is recorded. After 300 minutes, only 17.73% of the initial TOC content of the 4-chlorophenol is still present. The initial reaction rate is increased by 26% in comparison with P 25 (Example 8).

Example 11

Doping with MgO

4-Chlorophenol and 1 g/l of catalyst according to Example 3 in acidified aqueous suspension are introduced into the storage vessel and the stirred reactor and treated as indicated above. A $TOC/TOC_0$-time curve is recorded. After 300 minutes, only 10.91% of the initial TOC content of the 4-chlorophenol is still present. The initial reaction rate is increased by 36% in comparison with P 25 according to Example 8.

Example 12

Doping with ZnO

4-Chlorophenol and 1 g/l of catalyst according to Example 4 in acidified aqueous suspension are introduced into the storage vessel and the stirred reactor and treated as indicated above. A $TOC/TOC_0$-time curve is recorded. After 300 minutes, only 9.55% of the initial TOC content of the 4-chlorophenol is still present. The initial reaction rate is increased by 36% in comparison with P 25 according to Example 8.

Example 13

Doping with ZnO

4-Chlorophenol and 1 g/l of catalyst according to Example 5 in acidified aqueous suspension are introduced into the storage vessel and the stirred reactor and treated as indicated above. A $TOC/TOC_0$-time curve is recorded. After 300 minutes, 37.65% of the initial TOC content of the 4-chlorophenol is still present. The initial reaction rate is lowered by 31% in comparison with P 25 according to Example 8.

Example 14

$TiO_2$

4-Chlorophenol and 1 g/l of catalyst according to Example 6 in acidified aqueous suspension are introduced into the storage vessel and the stirred reactor and treated as indicated above. A $TOC/TOC_0$-time curve is recorded. After 300 minutes, only 18.18% of the initial TOC content of the 4-chlorophenol is still present. The initial reaction rate is increased by 12% in comparison with P 25 according to Example 8.

Test Results of the Photocatalytic Degradation of Dichloroacetic Acid (DCA).

Example 15

Blind Test

Only dichloroacetic acid in acidified aqueous solution is introduced into the storage vessel and the stirred reactor and treated as indicated above. No $TiO_2$ is added. A $TOC/TOC_0$-time curve is recorded. After 245 minutes, 95.45% of the initial TOC content is still present. An initial reaction rate is not determined.

Example 16

P 25

Dichloroacetic acid and 1 g/l of titanium dioxide P 25 in acidified aqueous suspension are introduced into the storage vessel and the stirred reactor and treated as indicated above. A $TOC/TOC_0$-time curve is recorded. After 245 minutes, 0% of the initial TOC content is present. The initial reaction rate is used as the standard and taken as zero. All values obtained with the titanium dioxides according to Examples 17 to 22 are based on this P 25 value.

Example 17

Doping with $Al_2O_3$

Dichloroacetic acid and 1 g/l of catalyst according to Example 1 in acidified aqueous suspension are introduced into the storage vessel and the stirred reactor and treated as indicated above. A $TOC/TOC_0$-time curve is recorded. After 201.89 minutes, 0% of the initial TOC content of the dichloroacetic acid was present. The initial reaction rate is increased by 84% in comparison with P 25 according to Example 16.

Example 18

Doping with $PtO_2$

Dichloroacetic acid and 1 g/l of catalyst according to Example 2 in acidified aqueous suspension are introduced into the storage vessel and the stirred reactor and treated as indicated above. A $TOC/TOC_0$-time curve is recorded. After 206.76 minutes, 0% of the initial TOC content of the dichloroacetic acid is present. The initial reaction rate is increased by 80% in comparison with P 25 according to Example 16.

Example 19

Doping with MgO

Dichloroacetic acid and 1 g/l of catalyst 3 in acidified aqueous suspension are introduced into the storage vessel and the stirred reactor and treated as indicated above. A $TOC/TOC_0$-time curve is recorded. After 200.27 minutes, 0% of the initial TOC content of the dichloroacetic acid is present. The initial reaction rate is increased by 73% in comparison with P 25 according to Example 16.

Example 20

Doping with ZnO

Dichloroacetic acid and 1 g/l of catalyst according to Example 4 in acidified aqueous suspension are introduced into the storage vessel and the stirred reactor and treated as indicated above. A $TOC/TOC_0$-time curve is recorded. After 189.73 minutes, 0% of the initial TOC content of the dichloroacetic acid is present. The initial reaction rate is increased by 76% in comparison with P 25 according to Example 16.

Example 21

Doping with ZnO

Dichloroacetic acid and 1 g/l of catalyst according to Example 5 in acidified aqueous suspension are introduced into the storage vessel and the stirred reactor and treated as indicated above. After 245 minutes, a residual $TOC/TOC_0$ value of 14.54% is present. After 245 minutes, complete degradation of the dichloroacetic acid is not to be observed. The initial reaction rate is increased by only 29% in comparison with P 25 according to Example 16.

Example 22

$TiO_2$

Dichloroacetic acid and 1 g/l of catalyst according to Example 6 in acidified aqueous suspension are introduced into the storage vessel and the stirred reactor and treated as indicated above. A $TOC/TOC_0$-time curve is recorded. After 206.76 minutes, 0% of the initial TOC content of the dichloroacetic acid is present. The initial reaction rate is increased by 55% in comparison with P 25 according to Example 16.

TABLE 1

Experimental conditions in the preparation of the oxides

| Example No. | $TiCl_4$ [kg/h] | Primary air [$Nm^3/h$] | Sec. air [$Nm^3/h$] | $H_2$ core [$Nm^3/h$] | $H_2$ jacket [$Nm^3/h$] | $N_2$ core [$Nm^3/h$] | Gas temp. [°C.] | Salt solution | Amount of aerosol [g/h] | $N_2$ aerosol [$Nm^3/h$] | BET surface area [$m^2/g$] |
|---|---|---|---|---|---|---|---|---|---|---|---|
| 1 | 0.66 | 3.41 | 0 | 0.54 | 0.23 | 0 | 235 | 1% $AlCl_3.x6H_2O$ | 126.0 | 0.04 | 75 |
| 2 | 0.65 | 3.41 | 0 | 0.54 | 0.23 | 0 | 240 | 0.5% $H_2PtCl_6$ | 27.0 | 0.04 | 73 |
| 3 | 0.66 | 3.41 | 0 | 0.54 | 0.23 | 0 | 240 | 0.5% $MgCl_2.x6H_2O$ | 21.4 | 0.04 | 77 |
| 4 | 0.65 | 3.41 | 0 | 0.54 | 0.23 | 0 | 235 | 3% $ZnCl_2$ | 31.7 | 0.04 | 78 |
| 5 | 1.32 | 2.68 | 0 | 0.33 | 0.10 | 0 | 247 | 2% $ZnCl_2$ | 112.6 | 0.04 | 56 |
| 6 | 0.42 | 3.78 | 0 | 0.21 | 0.23 | 0.04 | 230 | no doping | | 0 | 82 |

Explanation:

Primary air = amount of air in the central pipe;

Sec. air = secondary air;

$H_2$ core = hydrogen in the central pipe;

$H_2$ jacket = jacket hydrogen;

$N_2$ core = nitrogen in the central pipe;

Gas temp. = gas temperature in the nozzle of the central pipe;

Amount of aerosol = mass flow rate of the salt solution converted into aerosol form;

$N_2$ aerosol = amount of carrier gas (nitrogen) in the aerosol.

TABLE 2

Analytical data of the oxides obtained according to Examples 1 to 6

| Example No. | BET surface area [m²/g] | Amount of doping comp. [ppm] | Cl content [ppm] | LD [wt. %] | LI [wt. %] | pH [4% sus.] | Tamped density [g/l] |
|---|---|---|---|---|---|---|---|
| 1 | 75 | 606 | 130 | 0.55 | 1.26 | 5.09 | 209 |
| 2 | 73 | 93 | 53 | 0.63 | 1.75 | 4.96 | 241 |
| 3 | 77 | 48 | 57 | 1.3 | 0.85 | 5.79 | 220 |
| 4 | 78 | 415 | 44 | 0.77 | 1.26 | 6.05 | 219 |
| 5 | 56 | 1270 | 1320 | 1.01 | 1.23 | 4.93 | 315 |
| 6 | 82 | / |  | 0.84 | 1.79 | 5.01 | 152 |

Explanation:
Doping components (see Table 4) in μg/g (ppm);
LD = loss on drying (2 h at 105° C.), in accordance with DIN/ISO 787/II, ASTM D 280, JIS K 5101/21);
LI = loss on ignition (2 h at 1000° C.); in accordance with DIN 55921, ASTM D 1208, JIS K 5101/23, based on the substance dried at 105° C.;
tamped density in accordance with DIN/ISO 787/IX, JIS K 5101/18 (not sieved).

TABLE 3

Test results of the photocatalytic degradation of 4-CP (4-chlorophenol) by means of titanium dioxide and doped titanium dioxides after 300 minutes (min.).

| Example | Catalyst | Residual TOC/TOC₀ at t = 300 min. [%] |
|---|---|---|
| 7 | Blind test with irradiation (without TiO₂) | 89.82 |
| 8 | P25 | 20.91 |
| 9 | 1. TiO2/Al2O3 | 8.36 |
| 10 | 2. TiO2/PtO2 | 17.73 |
| 11 | 3. TiO2/MgO | 10.91 |
| 12 | 4. TiO2/ZnO | 9.55 |
| 13 | 5. TiO2/ZnO | 37.65 |

TABLE 3-continued

Test results of the photocatalytic degradation of 4-CP (4-chlorophenol) by means of titanium dioxide and doped titanium dioxides after 300 minutes (min.).

| Example | Catalyst | Residual TOC/TOC₀ at t = 300 min. [%] |
|---|---|---|
| 14 | 6. TiO2 | 18.18 |

TABLE 4

Test results of the photocatalytic degradation of DCA (dichloroacetic acid) by means of titanium dioxide or doped titanium dioxides

| Example | Catalyst | Residual TOC/TOC₀ [%] | Time [min.] |
|---|---|---|---|
| 15 | Blind test with irradiation (without TiO₂) | 95.45 | 245 |
| 16 | P25 | 0 | 245 |
| 17 | 1. TiO₂/Al₂O₃ | 0 | 201.89 |
| 18 | 2. TiO₂/PtO₂ | 0 | 206.76 |
| 19 | 3. TiO₂/MgO | 0 | 200.27 |
| 20 | 4. TiO₂/ZnO | 0 | 189.73 |
| 21 | 5. TiO₂/ZnO | 14.54 | 245 |
| 22 | 6. TiO₂ | 0 | 206.76 |

TABLE 5

Initial reaction rates of the titanium dioxides

| Catalyst | Doping component/ amount | BET surface area [m²/g] | DCA increase in % (comp. with P 25) | 4-CP increase in % (comp. with P 25) |
|---|---|---|---|---|
| P25 | / | 50 | 0 | 0 |
| acc. to Example 1. TiO₂/Al₂O₃ | Al₂O₃/606 ppm | 75 | 84 | 51 |
| acc. to Example 2. TiO₂/PtO₂ | PtO₂/93 ppm | 73 | 80 | 26 |
| acc. to Example 3. TiO₂/MgO | MgO/48 ppm | 77 | 73 | 36 |
| acc. to Example 4. TiO₂/ZnO | ZnO/415 ppm | 78 | 76 | 36 |
| acc. to Example 5. TiO₂/ZnO | ZnO/0.127% | 56 | 29 | — 31 (reduction) |
| acc. to Example 6. TiO₂ | / | 82 | 55 | 12 |

Reactor volume: 1.71

Source of radiation: UVH1022 Z4 iron-doped high-pressure mercury-discharge lamp;

Exclusion power 500 W (Heraeus)

Catalyst concentration: 1 g/l

Initial concentration of the chlorinated hydrocarbons: 120 mg/l

The tests to determine the initial reaction rates of the photocatalytic degradation of chlorinated hydrocarbons with UV irradiation and using titanium dioxides and doped titanium dioxides prepared by flame hydrolysis are carried out in purely aqueous or acidified aqueous suspension. The suspension is stirred constantly and irradiated continuously with the iron-doped high-pressure mercury-discharge lamp UVH1022 Z4. Cooling is provided for the lamp in order to ensure constant conditions. Likewise, the suspension is kept at a constant temperature by continuous pumping from the storage container to the reactor and back and by cooling.

What is claimed is:

1. A photocatalyst comprising pyrogenically prepared titanium dioxide doped by an aerosol and containing, as a doping component, an oxide selected from the group consisting of zinc oxide, platinum oxide, magnesium oxide, and aluminum oxide, wherein said photocatalyst has either:
   a) a BET surface area of 65 $m^2/g$ to 80 $m^2/g$ and a doping component concentration of 40ppm to 800 ppm; or
   b) a BET surface area of 35 $ppm^2/g$ to 60 $m^2/g$ and a doping component concentration of more than 1000 ppm.

2. Process for the preparation of the photocatalyst according to claim 1, the process comprising:
   (a) feeding an aerosol into a flame used for the preparation of pyrogenic titanium dioxide, wherein the titanium dioxide is prepared by flame oxidation or flame hydrolysis, and wherein the aerosol:
      (i) comprises a salt solution or suspension containing: a metal salt, a metalloid salt, mixtures of a metal salt and a metalloid salt, a suspension of a metal insoluble in water, a suspension of a metalloid compound, or a mixture of a suspension of a metal insoluble in water and a suspension of a metalloid compound,
      (ii) is produced by atomisation using a two-component nozzle, an aerosol generator, or ultrasound atomisation, and
      (iii) is mixed homogeneously with a gas mixture, wherein the gas mixture further comprises air, and allowed to react in the flame; and
   (b) separating the resulting photocatalys from the gas mixture.

3. An adsorbent for UV radiation comprising a pyrogenically prepared titanium dioxide having a BET surface area of 35 $m^2/g$ to 60 $m^2/g$ doped by means of an aerosol containing an oxide selected from the group consisting of zinc oxide, magnesium oxide, platinum oxide and aluminum oxide as the doping component present in an amount greater than 1000 ppm.

4. A glass or plastic article coated with the UV adsorbent of claim 3.

5. A process for purification of waste water comprising contacting waste water with a pyrogenically prepared titanium dioxide having a BET surface area of 65 $m^2/g$ to 80 $m^2/g$ doped by means of an aerosol and containing an oxide selected from the group consisting of zinc oxide, platinum oxide, magnesium oxide, and aluminum oxide as the doping component present in an amount of 40 ppm to 800 ppm.

6. A process for purification of waste air and/or waste gases comprising contacting the waste air and/or waste gases with a pyrogenically prepared titanium dioxide having a BET surface area of 65 $m^2/g$ to 80 $m^2/g$ doped by means of an aerosol and containing an oxide selected from the group consisting of zinc oxide, platinum oxide, magnesium oxide, and aluminum oxide as the doping component present in an amount of 40 ppm to 800 ppm.

* * * * *